United States Patent
Liu et al.

(10) Patent No.: US 10,439,787 B2
(45) Date of Patent: *Oct. 8, 2019

(54) LONG TERM EVOLUTION (LTE) NETWORK CONTROL OF CARRIER AGGREGATION FOR USER EQUIPMENT

(71) Applicant: Sprint Communications Company L.P., Overland Park, KS (US)

(72) Inventors: Chunmei Liu, Great Falls, VA (US); Hemanth Balaji Pawar, Brambleton, VA (US); Pratik Kothari, Sterling, VA (US); Krishna D. Sitaram, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/823,167

(22) Filed: Nov. 27, 2017

(65) Prior Publication Data

US 2018/0084552 A1 Mar. 22, 2018

Related U.S. Application Data

(63) Continuation of application No. 14/941,947, filed on Nov. 16, 2015, now Pat. No. 9,860,898.

(51) Int. Cl.
*H04L 5/00* (2006.01)
*H04W 76/30* (2018.01)

(52) U.S. Cl.
CPC ............ *H04L 5/0098* (2013.01); *H04L 5/001* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 8,917,664 B2 | 12/2014 | Jang et al. | |
| 9,155,081 B2 | 10/2015 | Seo et al. | |
| 2010/0304786 A1 | 12/2010 | Ou | |
| 2012/0140708 A1 | 6/2012 | Choudhury et al. | |
| 2012/0281597 A1 | 11/2012 | Khlat et al. | |
| 2013/0064219 A1 | 3/2013 | Siomina et al. | |
| 2013/0201834 A1 | 8/2013 | Klingenbrunn et al. | |
| 2014/0018071 A1 | 1/2014 | Mennerich et al. | |
| 2014/0092736 A1 | 4/2014 | Baillargeon | |
| 2015/0200690 A1 | 7/2015 | Youssef et al. | |

FOREIGN PATENT DOCUMENTS

| | | |
|---|---|---|
| CN | 101925163 | 12/2010 |
| CN | 103384971 | 11/2013 |

*Primary Examiner* — Christine T Duong

(57) ABSTRACT

A Long Term Evolution (LTE) access node to serve User Equipment (UEs) with a wireless Carrier Aggregation (CA) data communication service. A data processing system schedules CA Primary Component Carriers (PCCs), CA intra-band Secondary Component Carriers (SCCs) and CA inter-band SCCs for the UEs. A wireless transceiver wirelessly exchanges user data with the UEs based on the scheduling to serve the UEs with the CA PCCs, the CA intra-band SCCs, and the CA inter-band SCCs. The data processing system detects that a number of the UEs exceeds a UE threshold, and in response, identifies the UEs that use an LTE channel for their CA inter-band SCCs but not for their CA PCCs. The data processing system disables the LTE channel for the UEs that use the LTE channel for their CA inter-band SCCs but not for their CA PCCs.

20 Claims, 7 Drawing Sheets

LONG TERM EVOLUTION (LTE) NETWORK CONTROL OF CARRIER AGGREGATION FOR USER EQUIPMENT

RELATED CASES

This patent application is a continuation of U.S. patent application Ser. No. 14/941,947 that was filed on Nov. 16, 2015 and is entitled, "LONG TERM EVOLUTION (LTE) NETWORK CONTROL OF CARRIER AGGREGATION FOR USER EQUIPMENT." U.S. patent application Ser. No. 14/941,947 is hereby incorporated by reference into this patent application.

TECHNICAL BACKGROUND

Wireless communication networks typically include wireless access systems with equipment such as wireless access, control, and routing nodes that provide wireless communication services for User Equipment (UE). A typical wireless communication network includes systems to provide wireless access across a geographic region, with wireless coverage areas associated with individual wireless access nodes. The wireless access systems exchange user communications between UEs, service providers, and other end user devices. These user communications typically include voice calls, data, and signaling.

Long-Term Evolution (LTE) is a popular wireless data technology. Using LTE, an evolved NodeB (eNodeB) schedules Resource Blocks using modulation formats to increase the efficiency of exchanging wireless data. One modulation format that provides various schemes to transmit Resource Blocks is Orthogonal Frequency Division Multiplexing (OFDM). OFDM typically uses duplexing schemes such as Time Division Duplexing (TDD) and Frequency Division Duplexing (FDD). TDD separates uplinks from downlinks by allocating Resource Blocks into different time slots in the same frequency band. FDD allocates Resource Blocks into different frequency bands. This allows transmitters and receivers to send and receive data at the same time by altering the frequencies and times at which the signals are sent and received.

In some examples, a wireless communication system may employ Carrier Aggregation. Carrier Aggregation allows LTE networks to allocate multiple Resource Blocks simultaneously to aggregate the LTE channel. When carriers are aggregated, each carrier is referred to as a Component Carrier. A Primary Component Carrier is typically used to exchange signaling and data over a primary uplink carrier and downlink carrier. Secondary Component Carriers are typically used to exchange additional data over additional uplink and downlink carriers. UEs using Carrier Aggregation can typically use one or more Secondary Component Carriers.

Wireless networks can aggregate carriers over frequencies bands using Intra-Band Contiguous Carrier Aggregation, Intra-Band Non-Contiguous Carrier Aggregation, and Inter-Band Carrier Components. Intra-Band Contiguous Carrier Aggregation use Component Carriers that are in the same frequency band and are adjacent to each other. Intra-Band Non-Contiguous Carrier Aggregation use Component Carriers that are in the same frequency band but are not adjacent to each other. Inter-Band Carrier Aggregation use Component Carriers that are in different frequency bands.

Although Carrier Aggregation allows a faster exchange of data over multiple Component Carriers, it can also cause inefficiencies to the network since there is a limited amount of Resource Blocks each LTE channel can allocate. If one UE is using multiple Component Carriers, there are fewer Resource Blocks that may be allocated to other UEs over an LTE channel and therefore, initiating UE connections may be blocked, established UE connections may be dropped, or handover UE connections may be prevented. In addition, UEs using Component Carriers may cause signaling interference for other UEs exchanging data with the LTE network. Unfortunately, there is not an efficient or effective way for LTE networks to control Carrier Aggregation enabled UEs using multiple LTE channels for a Primary Component Carrier and one or more Secondary Component Carriers.

Technical Overview

A Long Term Evolution (LTE) access node to serve User Equipment (UEs) with a wireless Carrier Aggregation (CA) data communication service. A data processing system schedules CA Primary Component Carriers (PCCs), CA intra-band Secondary Component Carriers (SCCs) and CA inter-band SCCs for the UEs. A wireless transceiver wirelessly exchanges user data with the UEs based on the scheduling to serve the UEs with the CA PCCs, the CA intra-band SCCs, and the CA inter-band SCCs. The data processing system detects that a number of the UEs exceeds a UE threshold, and in response, identifies the UEs that use an LTE channel for their CA inter-band SCCs but not for their CA PCCs. The data processing system disables the LTE channel for the UEs that use the LTE channel for their CA inter-band SCCs but not for their CA PCCs.

DETAILED DESCRIPTION

Figure 1:
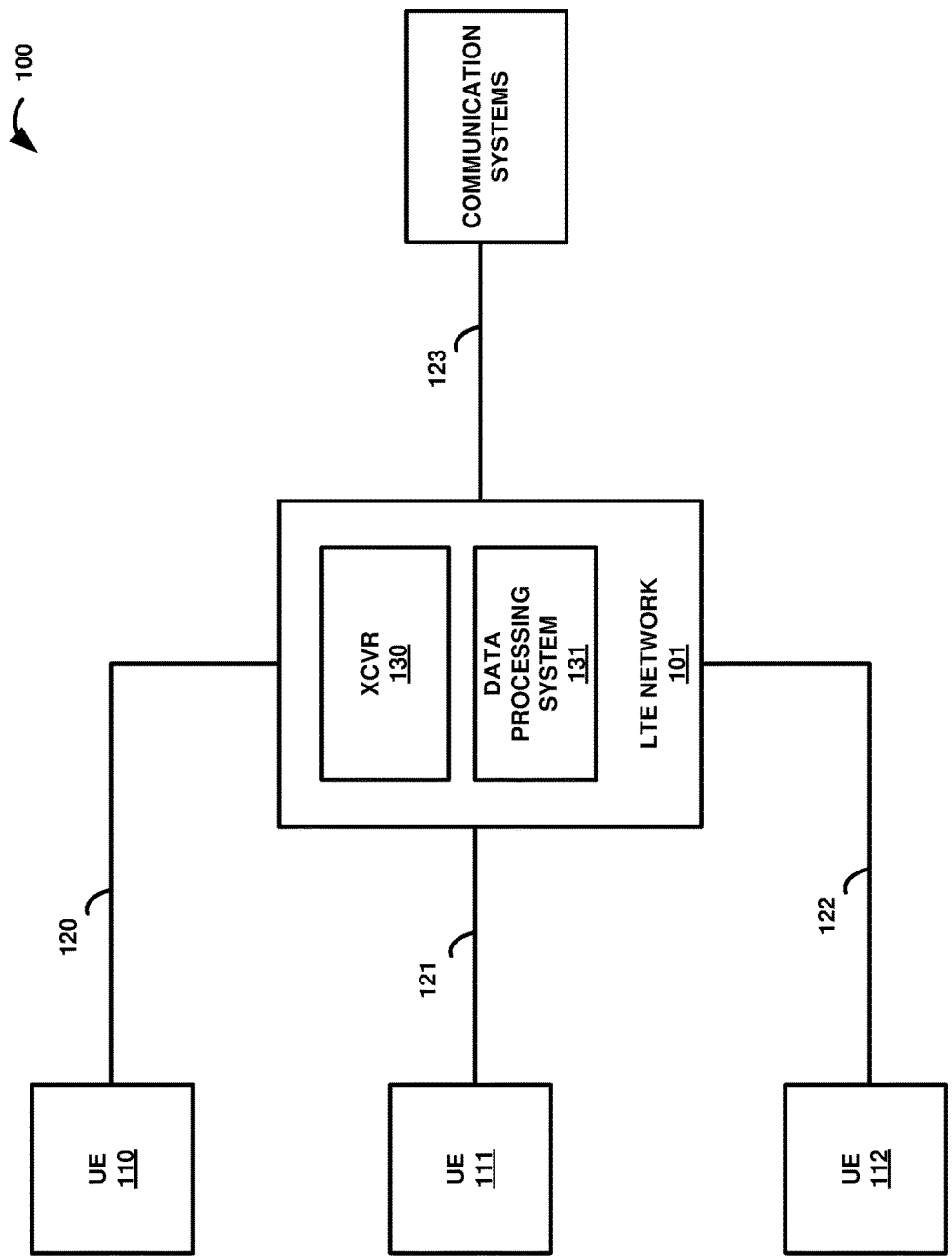
FIGS. 1-3 illustrate a Long Term Evolution (LTE) communication system to control LTE Carrier Aggregation for User Equipment (UE).
Figure 2:
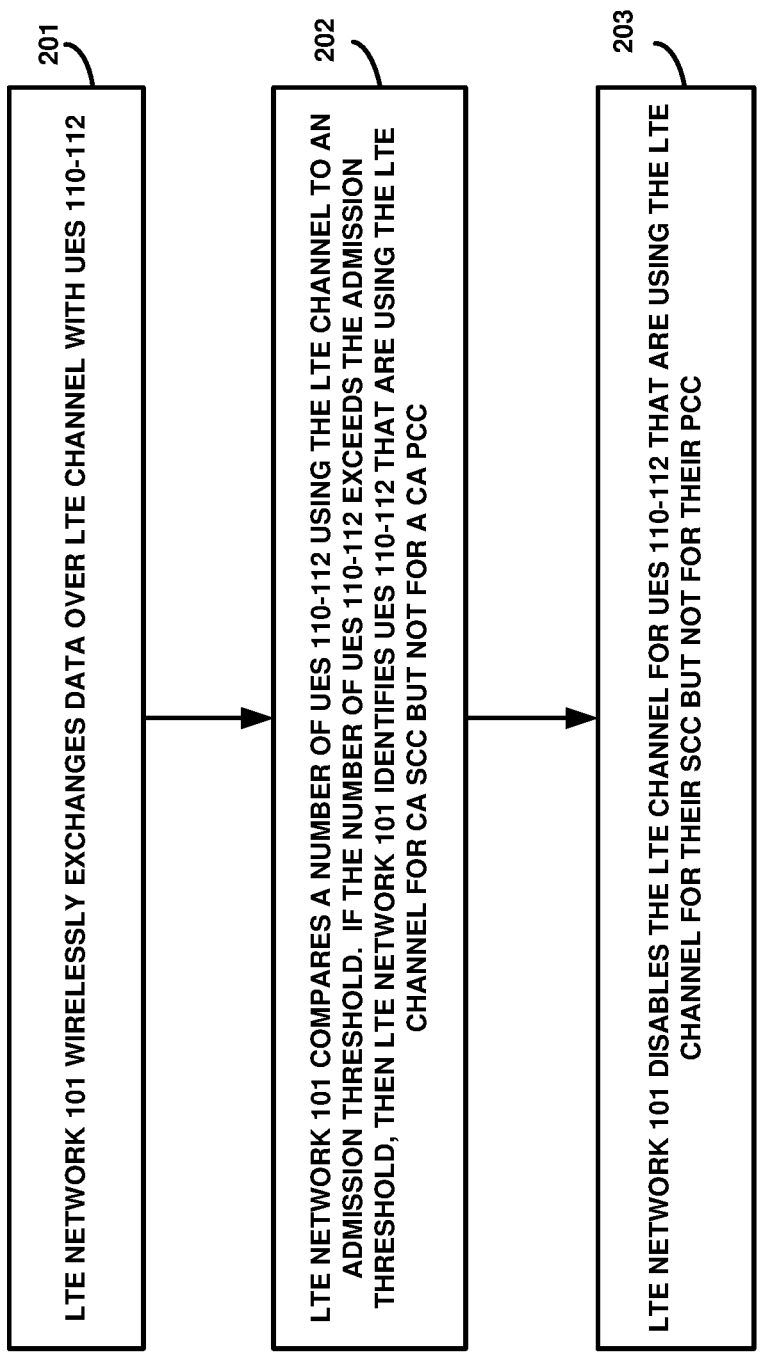
Figure 3:
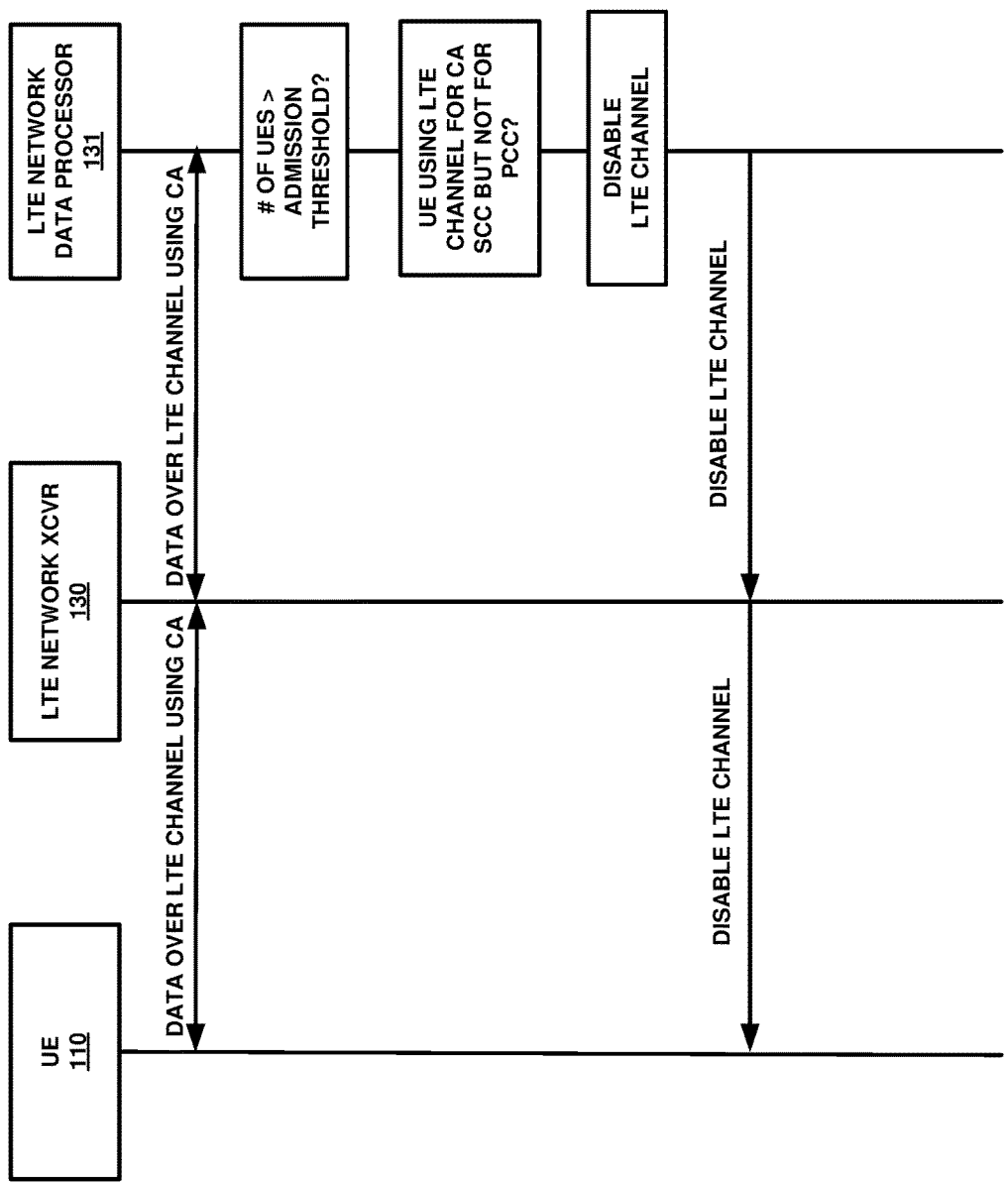

FIGS. 1-3 illustrate Long Term Evolution (LTE) communication system 100 to control LTE Carrier Aggregation for User Equipment (UE). LTE communication system 100 comprises LTE network 101, UEs 110-112, wireless links 120-122, communication link 123, and external communication systems. LTE network 101 includes LTE transceiver 130 and LTE data processing system 131. LTE network 101 and UEs 110-112 communicate over wireless links 120-122. LTE network 101 and external communication systems communicate over communication link 123.

In operation, LTE network 101 wirelessly exchanges data over an LTE channel with UEs 110-112. LTE network 101 may be exchanging data using Carrier Aggregation with at least some of UEs 110-112. Carrier Aggregation allows LTE network 101 to provide UEs 110-112 with a greater amount of data over a shorter period of time. Carrier Aggregation is typically performed by scheduling multiple Resource Blocks in a frequency band and/or by using various time slots to aggregate the LTE channel into Component Carriers in which UEs 110-112 may use one or more Component Carriers to exchange signaling and data with LTE network 101. A Primary Component Carrier is typically used to exchange signaling and data over a primary uplink carrier and downlink carrier. Secondary Component Carriers are typically used to exchange additional data over additional uplink and downlink carriers. UEs using Carrier Aggregation can typically use multiple Secondary Component Carriers but UEs cannot use multiple Primary Component Carriers.

While some of UEs 110-112 may communicate using multiple Component Carriers, other ones of UEs 110-112 may not. Therefore, it should be noted that not all of UEs 110-112 may be exchanging data over the LTE channel with LTE network 101 using Carrier Aggregation. For example, UEs 110-111 may be exchanging data using Carrier Aggregation, but UE 112 may be exchanging both signaling and data over a Primary Component Carrier without using Carrier Aggregation. Carrier Aggregation may be enabled for UEs 110-112 based on the type of UE, location of UE, International Mobile Subscriber Identity (IMSI), time of day, Access Point Name (APN), or some other Carrier Aggregation related indication.

In a next operation, LTE network 101 compares a number of UEs 110-112 using the LTE channel to an admission threshold, and if the number of UEs 110-112 exceeds the admission threshold, then LTE network 101 identifies UEs 110-112 that are using the LTE channel for a Carrier Aggregation Secondary Component Carrier but not for a Carrier Aggregation Primary Component Carrier. UEs 110-112 that are using the LTE channel for a Carrier Aggregation Secondary Component Carrier but not for a Carrier Aggregation Primary Component Carrier may be identified based on LTE network 101 by determining that UEs 110-112 are using the Primary Component Carrier to exchange signaling and data but using additional Component Carriers to exchange additional data.

For example, UE 110 uses the LTE channel as a Secondary Component Carrier to exchange additional data, UE 111 uses the LTE channel as a Secondary Component Carrier to exchange additional data, and UE 112 uses the LTE channel as its Primary Component Carrier to exchange signaling and data. If the channel admission threshold is exceeded, LTE network 101 may identify UE 110 as a UE that is using the LTE channel for a Carrier Aggregation Secondary Component Carrier but not for a Carrier Aggregation Primary Component Carrier.

The admission threshold may be a threshold amount the LTE channel can handle before initiating UE connections are blocked, established UE connections are dropped, or handover UE connections are prevented. The admission threshold may be determined based on a total number of Radio Resource Control (RRC) connected UEs 110-112, a total number of UEs 110-112 using Carrier Aggregation, hardware limitations, performance limitations, or some other admission threshold criterion.

The admission threshold may also contain a buffer range admission threshold before the actual admission threshold is reached such that UEs 110-112 that are using the LTE channel for a Carrier Aggregation Secondary Component Carrier but not for a Carrier Aggregation Primary Component Carrier are identified before initiating UE connections are blocked, established UE connections are dropped, or handover UE connections are prevented. For example, the actual limit on RRC connected UEs 110-112 may be 500 UEs based on performance limitations. However, once the number of RRC connected UEs 110-112 reaches 495 UEs, UEs 110-112 that are using the LTE channel for a Carrier Aggregation Secondary Component Carrier but not for a Carrier Aggregation Primary Component Carrier are identified.

LTE network 101 disables the LTE channel for UEs 110-112 that are using the LTE channel for their Secondary Component Carrier but not for their Primary Component Carrier. LTE communication network 101 may disable LTE channel by LTE network 101 scheduling fewer Resource Blocks for UEs 110-112 and instructing UEs 110-112 that are using the LTE channel for their Secondary Component Carrier but not for their Primary Component Carrier to narrow their bandwidth based on the new scheduling grants. This allows LTE network 101 to have less channel connections without blocking initiating UE connections, dropping established UE connections, or preventing handover UE connections. This may also decrease signal interference for UEs 110-112 since there would be fewer UEs connections interacting with LTE network 101.

For example, the LTE channel for UE 110 that is using the LTE channel for its Secondary Component Carrier but not for its Primary Component Carrier would be disabled to allow other UE connections that would otherwise have been blocked, dropped, or prevented from being handed over if the number of UE connections exceeds 495 UE connections. This may also result in less signal interference for UEs 111-112. In this example, UE 110 would still be able to exchange signaling with its Primary Component Carrier over another LTE channel.

In some examples, LTE network 101 identifies UEs 110-112 that are using the LTE channel for a Secondary Component Carrier but not for a Primary Component Carrier, and also using another LTE channel as another Secondary Component Carrier. LTE network 101 then disables the LTE channel for UEs 110-112 that are using another LTE channel for their Secondary Component Carrier. For example, UE 110 may be using the current LTE channel as a Secondary Component Carrier, a different LTE channel as a Primary Component Carrier, and another LTE channel as an additional Secondary Component Carrier. In this example, LTE network 101 may disable UE 110 which is using 3 LTE channels before disabling other UEs which are only using 2 LTE channels if the admission threshold is exceeded.

In some examples, LTE network 101 identifies UEs 110-112 that are using the LTE channel for their Secondary Component Carrier but not for their Primary Component Carrier and using Inter-Band Carrier Aggregation. LTE network 101 would then disable the LTE channel for UEs 110-112 that are using the other LTE channel for their Secondary Component Carrier and using Inter-Band Carrier Aggregation. Inter-Band Carrier Aggregation uses Component Carriers that are in different frequency bands.

In some examples, LTE network 101 identifies UEs 110-112 that are using another LTE channel for their Secondary Component Carrier and using Intra-Band Non-Contiguous Carrier Aggregation. LTE network 101 would then disable the LTE channel for UEs 110-112 that are using the other LTE channel for their Secondary Component Carrier and using Intra-Band Non-Contiguous Carrier Aggregation. Intra-Band Non-Contiguous Carrier Aggregation uses Component Carriers that are in the same frequency band but are not adjacent to each other.

In some examples, LTE network 101 identifies UEs 110-112 that are using another LTE channel for their Secondary Component Carrier and using Intra-Band Contiguous Carrier Aggregation. LTE network 101 would then disable the LTE channel for UEs 110-112 that are using the other LTE channel for their Secondary Component Carrier and using Intra-Band Contiguous Carrier Aggregation. Intra- Band Contiguous Carrier Aggregation use Component Carriers that are in the same frequency band and are adjacent to each other.

In some examples, after disabling the LTE channel for UEs 110-112 that are using the LTE channel for their Secondary Component Carrier but not for their Primary Component Carrier, LTE network 101 identifies additional UEs 110-112 that are using the LTE channel for their Primary Component Carrier but not for their Secondary Component Carrier. LTE network 101 then switches their Primary Component Carrier and their Secondary Component Carrier and disables the LTE channel for the additional UEs 110-112 that are using the LTE channel for their Secondary Component Carrier but not for their Primary Component Carrier.

For example, if the admission threshold is still exceeded after disabling UE 110 which is using the LTE channel for its Secondary Component Carrier but not for its Primary Component Carrier, LTE network 101 may then identify UE 111 which is using the LTE channel for its Primary Component Carrier but not for its Secondary Component Carrier. LTE network 101 would then switch its Secondary Component Carrier to be its Primary Component Carrier and disable the LTE channel for UE 111.

In some examples, after disabling the LTE channel for UEs 110-112 that are using the LTE channel for their Secondary Component Carrier but not for their Primary Component Carrier, LTE network 101 identifies additional UEs 110-112 that are using the LTE channel for their Primary Component Carrier but not for their Secondary Component Carrier and using Inter-Band Carrier Aggregation. LTE network 101 then switches their Primary Component Carrier and their Secondary Component Carrier and disables the LTE channel for the additional UEs 110-112 that are using the LTE channel for their Secondary Component Carrier but not for their Primary Component Carrier and using Inter-Band Carrier Aggregation.

In some examples, after disabling the LTE channel for UEs 110-112 that are using the LTE channel for their Secondary Component Carrier but not for their Primary Component Carrier, LTE network 101 identifies additional UEs 110-112 that are using the LTE channel for their Primary Component Carrier but not for their Secondary Component Carrier and using Intra-B and Non-Contiguous Carrier Aggregation. LTE network 101 then switches their Primary Component Carrier and their Secondary Component Carrier and disables the LTE channel for the additional UEs 110-112 that are using the LTE channel for their Secondary Component Carrier but not for their Primary Component Carrier and using Intra-B and Non-Contiguous Carrier Aggregation.

In some examples, after disabling the LTE channel for UEs 110-112 that are using the LTE channel for their Secondary Component Carrier but not for their Primary Component Carrier, LTE network 101 identifies additional UEs 110-112 that are using the LTE channel for their Primary Component Carrier but not for their Secondary Component Carrier and using Intra-B and Contiguous Carrier Aggregation. LTE network 101 then switches their Primary Component Carrier and their Secondary Component Carrier and disables the LTE channel for the additional UEs 110-112 that are using the LTE channel for their Secondary Component Carrier but not for their Primary Component Carrier and using Intra-B and Contiguous Carrier Aggregation.

In some examples, LTE network 101 compares a number of UEs 110-112 using Carrier Aggregation on the LTE channel to a Carrier Aggregation admission threshold. If the number of UEs 110-112 using Carrier Aggregation on the LTE channel exceeds the Carrier Aggregation admission threshold, then LTE network 101 identifies UEs 110-112 that are using the LTE channel for the Secondary Component Carrier but not for the Primary Component Carrier.

FIG. 2 is a flow diagram illustrating an operation of LTE communication system 100 to control Carrier Aggregation. LTE network 101 wirelessly exchanges (201) data over an LTE channel with UEs 110-112. LTE network 101 compares (202) a number of UEs 110-112 using the LTE channel to an admission threshold. If the number of UEs 110-112 exceeds the admission threshold, then LTE network 101 identifies (202) UEs 110-112 that are using the LTE channel for a Carrier Aggregation Secondary Component Carrier but not for a Carrier Aggregation Primary Component Carrier. LTE network 101 disables (203) the LTE channel for UEs 110-112 that are using the LTE channel for their Secondary Component Carrier but not for their Primary Component Carrier.

FIG. 3 illustrates the operation of LTE communication system 100 to control Carrier Aggregation. LTE network transceiver 130 wirelessly exchanges data over an LTE channel with UE 110 by using Carrier Aggregation. LTE data processing system 131 compares a number of UEs 110-112 using the LTE channel to an admission threshold. If the number of UEs 110-112 exceeds the admission threshold, then LTE data processing system 131 identifies UE 110 that is using the LTE channel for a Carrier Aggregation Secondary Component Carrier but not for a Carrier Aggregation Primary Component Carrier. LTE data processing system 131 then disables the LTE channel UE 110 that is using the LTE channel for their Secondary Component Carrier but not for its Primary Component Carrier.

Figure 4:
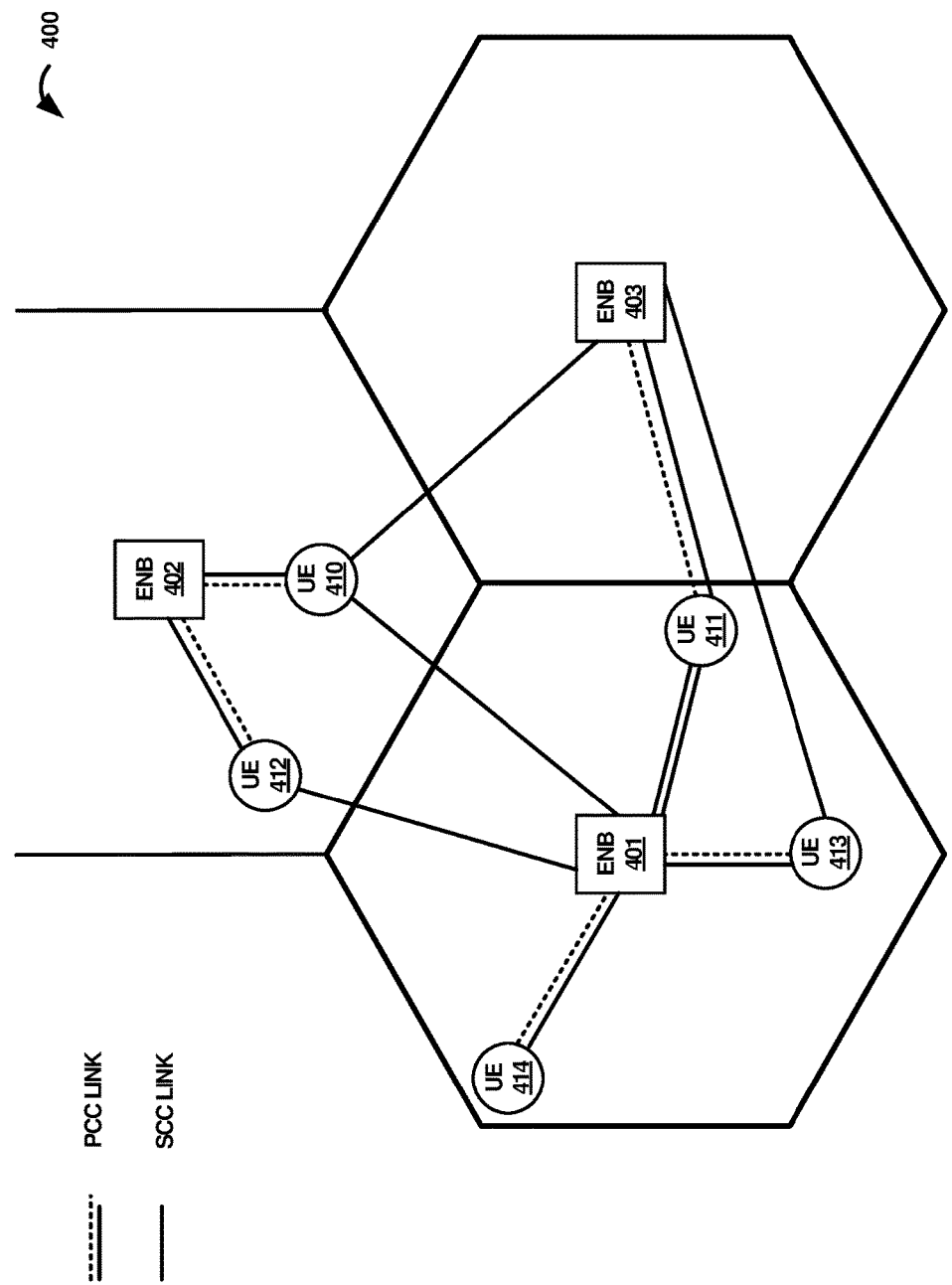
FIGS. 4-6 illustrate an LTE communication system to control LTE Carrier Aggregation for UEs.

FIG. 4 illustrates LTE communication system 400 to control Carrier Aggregation. LTE communication system 400 is an example of LTE communication system 100, although LTE communication system 100 may use alternative configurations and operations. LTE communication system 400 includes eNodeBs 401-403 and UEs 410-414. As illustrated in FIG. 4, the dotted lines paired with the solid lines between UEs 410-414 and eNodeBs 401-403 indicate Primary Component Carriers to exchange signaling and data, and the single solid lines between UEs 410-414 and eNodeBs 401-403 indicate Secondary Component Carriers to exchange additional data.

Still referring to FIG. 4, UE 410 exchanges signaling and data with eNodeB 402 over a Primary Component Carrier and additional data with eNodeBs 401 and 403 over Secondary Component Carriers. UE 411 exchanges signaling and data with eNodeB 403 over a Primary Component Carrier and additional data with eNodeB 401 over two Secondary Component Carriers. UE 412 exchanges signaling and data with eNodeB 402 over a Primary Component Carrier and additional data with eNodeB 401 over a Secondary Component Carrier. UE 413 exchanges signaling and data with eNodeB 401 over a Primary Component Carrier and additional data with eNodeB 402 over a Secondary Component Carrier. UE 414 exchanges signaling and data with eNodeB 401 over a Primary Component Carrier.

Figure 5:
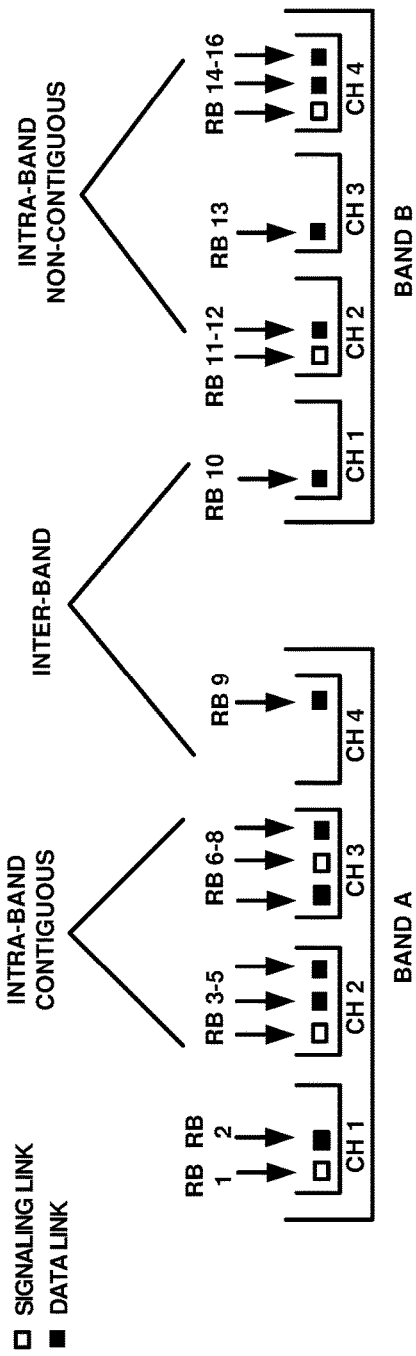

Referring to FIG. 5, Channels within Band A and Band B are aggregated to illustrate the use of Inter-Band Carrier Aggregation, Intra-B and Non-Contiguous Carrier Aggregation, and Intra-Band Contiguous Carrier Aggregation. As indicated in FIG. 5, eNodeB 401 allocates adjacent Channels in a Band for Intra-Band Contiguous Carrier Aggregation. For example, Channel 2 and Channel 3 are adjacent in Band A. eNodeB 401 allocates non-adjacent Channels in a Band for Intra-Band Non-Contiguous Carrier Aggregation. For example, Channel 2 and Channel 4 are non-adjacent in Band B. eNodeB 401 allocates Channels in different Bands for Inter-Band Carrier Aggregation. For example, Channel 4 in Band A and Channel 1 in Band B. FIG. 5 also indicates that filled Resource Blocks represent data links and unfilled Resource Blocks represent signaling links. In should be noted that each Primary Component Carrier contains a Resource Block for signaling and a Resource Block for data.

Still referring to FIG. 5, Table 1 indicates channel allocations by eNodeB 401 for UEs 410-414. As indicated in Table 1, UE 410 uses Inter-Band Carrier Aggregation and is allocated to use Resource Blocks 1 and 2 of Channel 1 in Band A as a Primary Component Carrier and Resource Block 9 of Channel 4 in Band A and Resource Block 10 of Channel 1 in Band B for Secondary Component Carriers. UE 411 uses Intra-Band Contiguous Carrier Aggregation and is allocated to use Resource Blocks 3, 4, and 5 of Channel 2 in Band A as a Primary Component Carrier and Resource Block 6 of Channel 3 in Band A for Secondary Component Carriers.

UE 412 uses Intra-B and Non-Contiguous Carrier Aggregation and is allocated to use Resource Blocks 11 and 12 of Channel 2 in Band B as a Primary Component Carrier and Resource Block 16 of Channel 4 in Band B for a Secondary Component Carrier. UE 413 uses Intra-Band Contiguous Carrier Aggregation and is allocated to use Resource Blocks 14 and 15 of Channel 4 in Band B as a Primary Component Carrier and Resource Block 13 of Channel 3 in Band B for a Secondary Component Carrier. UE 414 does not use Carrier Aggregation and is allocated to use Resource Blocks 7 and 8 of Channel 3 in Band A for its Carrier.

Figure 6:
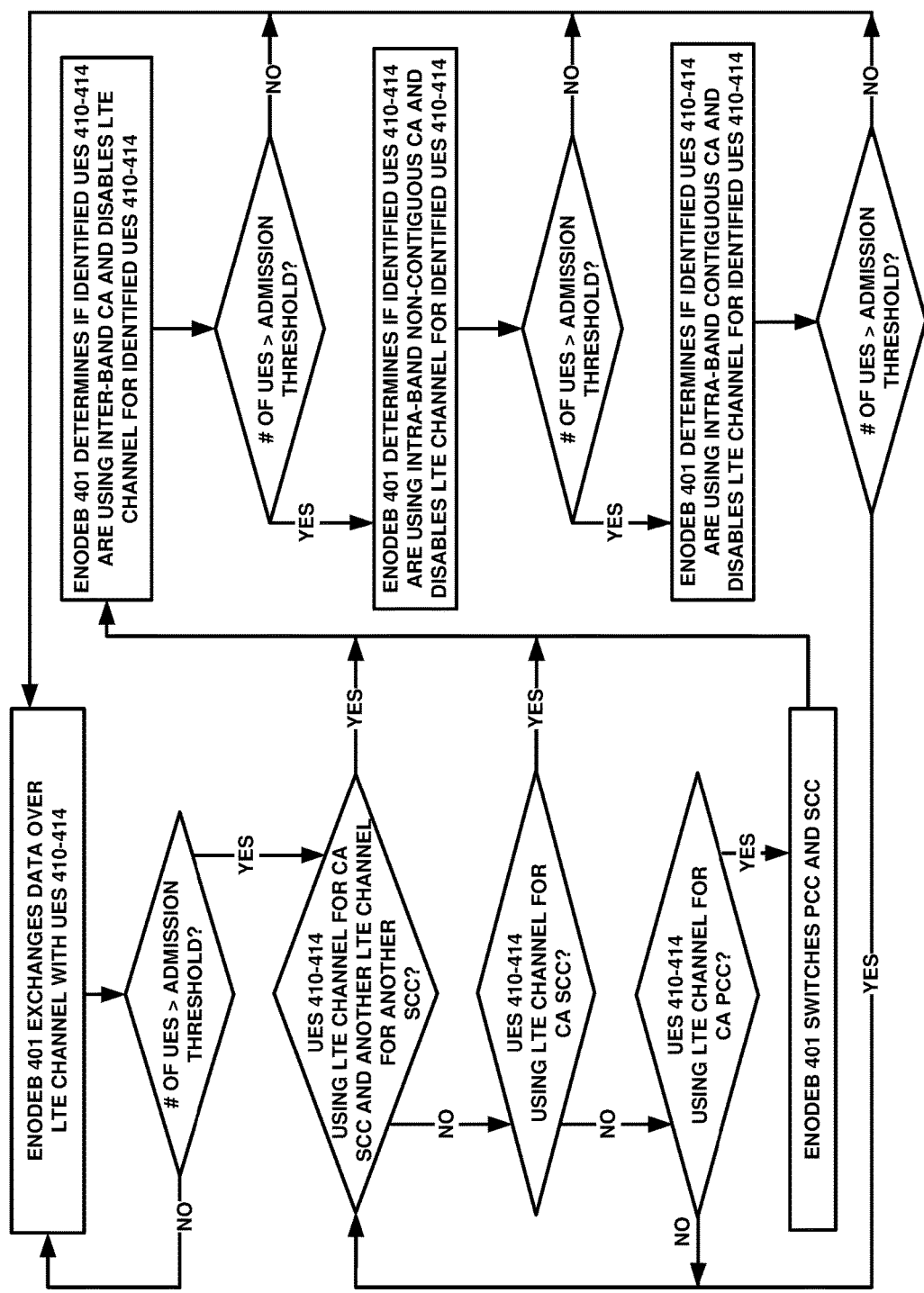

FIG. 6 is a flow diagram illustrating an operation of LTE communication system 400 to control Carrier Aggregation for UEs. In a first operation, eNodeB 401 wirelessly exchanges data over LTE channels with UE 410-414. eNodeB 401 then compares the number of UEs 410-414 using the LTE channel to an admission threshold. If the number of UEs 410-414 exceeds the admission threshold, then eNodeB 401 identifies if any of UEs 410-414 are using the LTE channel for a Secondary Component Carrier but not for a Primary Component Carrier and using another LTE channel for another Secondary Component Carrier. In this example, UE 410 and UE 411 are using the LTE channel with eNodeB 401 as a Secondary Component Carrier but not as a Primary Component Carrier and using another LTE channel for another Secondary Component Carrier.

If eNodeB 401 identifies any of UEs 410-414 that are using the LTE channel for a Secondary Component Carrier but not as a Primary Component Carrie, and using another LTE channel for another Secondary Component Carrier, then eNodeB 401 determines if any of the identified UEs 410-414 is using Inter-Band Carrier Aggregation and disables the LTE channel for UEs 410-414 using the LTE channel with eNodeB 401 as a Secondary Component Carrier but not as a Primary Component Carrier, using another Secondary Component Carrier, and using Inter-Band Carrier Aggregation. In this example, eNodeB 401 determines that UE 410 is using Inter-Band Carrier Aggregation and disables the LTE channel for UE 410.

eNodeB 401 then compares the number of UEs 410-414 using the LTE channel to the admission threshold. If the number of UEs 410-414 exceeds the admission threshold, then eNodeB 401 determines if any of the identified UEs 410-414 is using Intra-Band Non-Contiguous Carrier Aggregation and disables the LTE channel for UEs 410-414 using the LTE channel with eNodeB 401 as a Secondary Component Carrier but not as a Primary Component Carrier, using another Secondary Component Carrier, and using Intra-Band Non-Contiguous Carrier Aggregation.

Still referring to FIG. 6, eNodeB 401 then compares the number of UEs 410-414 using the LTE channel to the admission threshold. If the number of UEs 410-414 exceeds the admission threshold, then eNodeB 401 determines if any of the identified UEs 410-414 is using Intra-Band Contiguous Carrier Aggregation and disables the LTE channel for UEs 410-414 using the LTE channel with eNodeB 401 as a Secondary Component Carrier but not for a Primary Component Carrier, using another Secondary Component Carrier, and using Intra-Band Contiguous Carrier Aggregation. In this example, eNodeB 401 determines that UE 411 is using the LTE channel with eNodeB 401 for a Secondary Component Carrier but not for a Primary Component Carrier, using another Secondary Component Carrier, and using Intra-Band Contiguous Carrier Aggregation. Therefore eNodeB 401 disables the LTE channel for UE 411.

In a next operation, eNodeB 401 compares the number of UEs 410-414 using the LTE channel to the admission threshold. If the number of UEs 410-414 still exceeds the admission threshold, then eNodeB 401 identifies if any of UEs 410-414 are using the LTE channel for a Secondary Component Carrier but not for a Primary Component Carrier. In this example, UE 412 is using the LTE channel with eNodeB 401 as a Secondary Component Carrier but not for a Primary Component Carrier.

If eNodeB 401 identifies any of UEs 410-414 that are using the LTE channel for a Secondary Component Carrier but not for a Primary Component Carrier, then eNodeB 401 determines if any of the identified UEs 410-414 is using Inter-Band Carrier Aggregation and disables the LTE channel for UEs 410-414 using the LTE channel with eNodeB 401 as a Secondary Component Carrier but not as a Primary Component Carrier and using Inter-Band Carrier Aggregation.

eNodeB 401 then compares the number of UEs 410-414 using the LTE channel to the admission threshold. If the number of UEs 410-414 still exceeds the admission threshold, then eNodeB 401 determines if any of the identified UEs 410-414 using the LTE channel for a Secondary Component Carrier but not for a Primary Component Carrier is using Intra-Band Non-Contiguous Carrier Aggregation and disables the LTE channel for UEs 410-414 using the LTE channel with eNodeB 401 as a Secondary Component Carrier and using Intra-Band Non-Contiguous Carrier Aggregation. In this example, UE 412 is using the LTE channel with eNodeB 401 as a Secondary Component Carrier and using Intra-Band Non-Contiguous Carrier Aggregation. Therefore, eNodeB 401 disables the LTE channel for UE 412.

Still referring to FIG. 6, eNodeB 401 then compares the number of UEs 410-414 using the LTE channel to the admission threshold. If the number of UEs 410-414 still exceeds the admission threshold, then eNodeB 401 determines if any of the identified UEs 410-414 is using Intra-Band Contiguous Carrier Aggregation and disables the LTE channel for UEs 410-414 using the LTE channel with eNodeB 401 as a Secondary Component Carrier but not for a Primary Component Carrier and using Intra-Band Contiguous Carrier Aggregation.

In a next operation, eNodeB 401 compares the number of UEs 410-414 using the LTE channel to the admission threshold. If the number of UEs 410-414 still exceeds the admission threshold, then eNodeB 401 identifies if any of UEs 410-414 are using the LTE channel for a Primary Component Carrier but not for a Secondary Component Carrier and responsively switches their Primary Component Carrier and their Secondary Component Carrier. In this example, UE 413 is using the LTE channel with eNodeB 401 as a Primary Component Carrier but not for a Secondary Component Carrier. Therefore, eNodeB 401 switches the Primary Component Carrier and the Secondary Component Carrier for UE 413.

eNodeB 401 then determines is any of the switched UEs 410-414 using the LTE channel for a Secondary Component Carrier but not for a Primary Component Carrier is using Inter-Band Carrier Aggregation and disables the LTE channel for UEs 410-414 using the LTE channel with eNodeB 401 as a Secondary Component Carrier but not for a Primary Component Carrier and using Inter-Band Carrier Aggregation.

eNodeB 401 then compares the number of UEs 410-414 using the LTE channel to the admission threshold. If the number of UEs 410-414 still exceeds the admission threshold, then eNodeB 401 determines if any of the switched UEs 410-414 using the LTE channel as a Secondary Component Carrier is using Intra-Band Non-Contiguous Carrier Aggregation and disables the LTE channel for UEs 410-414 using the LTE channel with eNodeB 401 as a Secondary Component Carrier and using Intra-Band Non-Contiguous Carrier Aggregation.

Still referring to FIG. 6, eNodeB 401 then compares the number of UEs 410-414 using the LTE channel to the admission threshold. If the number of UEs 410-414 still exceeds the admission threshold, then eNodeB 401 determines if any of the switched UEs 410-414 is using Intra-Band Contiguous Carrier Aggregation and disables the LTE channel for UEs 410-414 using the LTE channel with eNodeB 401 as a Secondary Component Carrier and using Intra-Band Contiguous Carrier Aggregation. In this example, UE 413 is using the LTE channel with eNodeB 401 as a Secondary Component Carrier and using Intra-B and Non-Contiguous Carrier Aggregation. Therefore, eNodeB 401 disables the LTE channel for UE 413.

Figure 7:
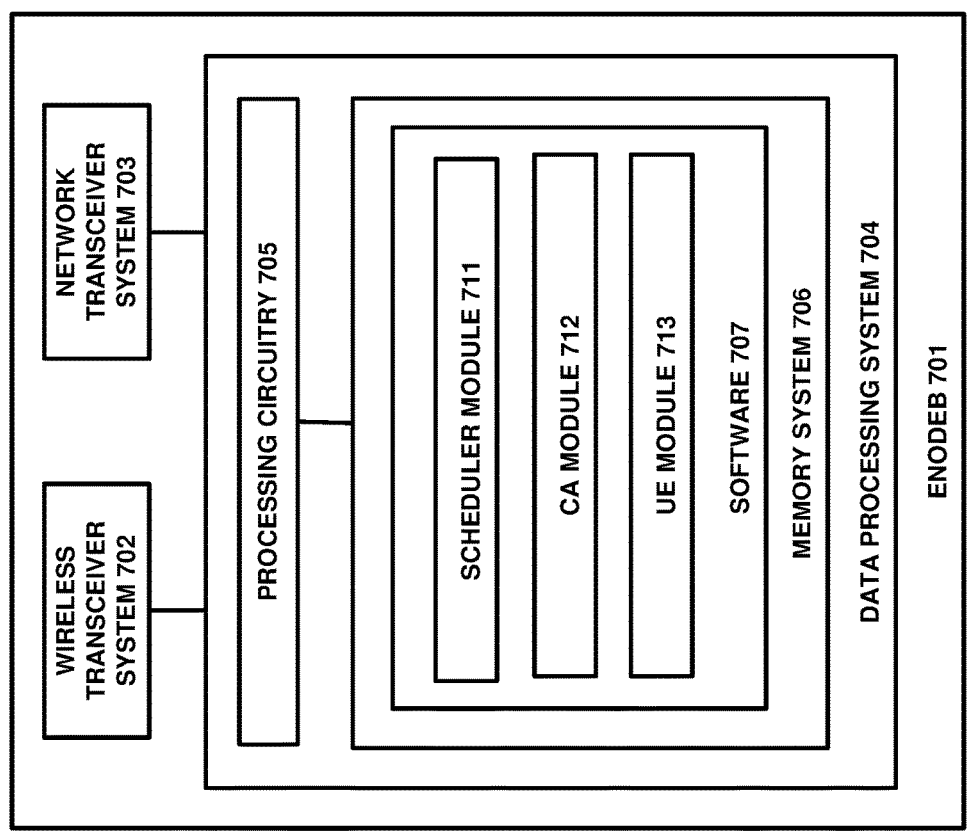
FIG. 7 illustrates an evolved NodeB (eNodeB) to control LTE Carrier Aggregation for UEs.

FIG. 7 illustrates eNodeB 701 to control LTE CA for UE. eNodeB 701 is an example of LTE communication system 100 and eNodeB 401, although these systems may use alternative configurations and operations. eNodeB 701 comprises wireless transceiver system 702, network transceiver system 703, and data processing system 704. Data processing system 704 includes processing circuitry 705 and memory system 706 that stores software 707. Software 707 comprises software modules 711-713.

Wireless transceiver system 702 and network transceiver system 703 comprise components that communicate over communication links such as network cards, ports, RF transceivers, processing circuitry and software, or some other communication components. Wireless transceiver system 702 may be configured to use Carrier Aggregation to allow UEs to use multiple signaling channels simultaneously. Network transceiver system 703 may be configured to use TDM, IP, Ethernet, optical networking, wireless protocols, backhaul signaling, or some other communication format—including combinations thereof.

Processor circuitry 705 comprises microprocessor and other circuitry that retrieves and executes operating software 707 from memory system 706. Processor circuitry 705 may comprise a single device or could be distributed across multiple devices—including devices in different geographic areas. Processor circuitry 705 may be embedded in various types of equipment. Examples of processor circuitry 705 include central processing units, application specific processors, logic devices, and/or any type of computer processing devices—including combinations thereof. When executed by processing circuitry 705, software 707 directs data processing system 704 to operate eNodeB 701 as described herein.

Memory system 706 comprises a non-transitory computer readable storage medium readable by processing system 705 and capable of storing software 707, such as a disk drive, flash drive, data storage circuitry, or some other hardware memory apparatus—including combinations thereof. Memory system 706 can include volatile and non-volatile, removable and non-removable media implemented in any method or technology for storage of information, such as computer readable instructions, data structures, program modules, or other data—including combinations thereof. Memory system 706 may comprise a single device or could be distributed across multiple devices—including devices in different geographic areas. Memory system 706 may be embedded in various types of equipment. In some examples, a computer apparatus could comprise memory system 706 and software 707.

Software 707 may be implemented in program instructions and may be executed by data processing system 704. Software 707 comprises computer programs, firmware, or some other form of machine-readable processing instructions. Software 707 may include an operating system, utilities, drivers, network interfaces, applications, or some other type of software. In this example, software 707 comprises scheduler module 711, Carrier Aggregation module 712, and UE module 713, although software 707 could have alternative configurations in other examples. When executed by processing circuitry 705, software 707 directs data processing system 704 to operate as described herein.

In particular, when executed by processing circuitry 705, scheduler module 711 directs data processing system 704 to schedule Resource Blocks for uplinks and downlinks to wirelessly exchange data over an LTE channel with UEs. When executed by processing circuitry 705, Carrier Aggregation module 712 directs data processing system 704 to aggregate carriers and drive scheduler module 411 to allocate multiple Resource Blocks for UEs.

When executed by processing circuitry 705, UE module 713 directs data processing system 704 to compare a number of the UEs using the LTE channel to a channel admission threshold. When executed by processing circuitry 705, UE module 713 also directs data processing system 704 to identify UEs that are using the LTE channel for a Carrier Aggregation Secondary Component Carrier but not for a Carrier Aggregation Primary Component Carrier if the number of UEs exceeds the channel admission threshold. When executed by processing circuitry 705, UE module 713 also directs data processing system 704 to disable the LTE channel for UEs that are using the LTE channel for their Secondary Component Carrier but not for their Primary Component Carrier.

Referring back to FIG. 1, LTE network 101 transfers data between UEs 110-112 and external communication systems, such as Internet, virtual networks, and other external systems. LTE network 101 comprises network elements, such as access nodes, management nodes, gateway systems, server systems, or other data communication network element—including combinations thereof. LTE network 101 may also include other components such as a router, server, data storage system, and power supply. LTE network 101 may reside in a single device or may be distributed across multiple devices.

UEs 110-112 include communication transceivers, such as antennas, ports, interfaces, processing circuitry, and memory. UEs 110-112 may be telephones, computers, e-books, mobile Internet appliances, wireless network interface cards, media players, game consoles, or some other wireless communication apparatuses—including combinations thereof.

Wireless links 120-122 use the air, space, or other materials to transport media, and communicate with wireless devices using LTE format. Wireless links 120-122 each comprises one or more wireless communication links provided over an associated wireless frequency spectrum or wireless frequency band, and can use various protocols, such as LTE, LTE-Advanced (LTE-A), Code Division Multiple Access (CDMA), 3rd Generation Partnership Project (3GPP), Orthogonal Frequency-Division Multiple Access (OFDMA), Wideband Code Division Multiple Access (W-CDMA), Time Division Synchronous Code Division Multiple Access (TD-SCDMA), or some other cellular or wireless communication format, including combinations, improvements, or variations thereof.

Wireless links 120-122 may each include many different signal sharing components, such as resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or other communication components.

Communication link 123 may communicate using air, space, glass, metal, or other materials to transport media. Communication link 123 could use various communication protocols, such as Time Division Multiplex (TDM), Internet Protocol (IP), Ethernet, backhaul signaling, wireless communication signaling, or some other communication format—including combinations thereof. Communication link 123 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) access node to serve User Equipment (UEs) with a wireless Carrier Aggregation (CA) data communication service, the method comprising:
    in the LTE access node, a data processing system scheduling CA Primary Component Carriers (PCCs), CA intra-band Secondary Component Carriers (SCCs) and CA inter-band SCCs for the UEs;
    in the LTE access node, a wireless transceiver wirelessly exchanging user data with the UEs based on the scheduling to serve the UEs with the CA PCCs, the CA intra-band SCCs, and the CA inter-band SCCs; and
    in the LTE access node, the data processing system detecting that a number of the UEs exceeds a UE threshold, and in response, identifying ones of the UEs that use an LTE channel for their CA inter-band SCCs but not for their CA PCCs and disabling the LTE channel for the ones of the UEs that use the LTE channel for their CA inter-band SCCs but not for their CA PCCs.

2. The method of claim 1 wherein the data processing system scheduling the CA intra-band SCCs comprises scheduling CA intra-band non-contiguous SCCs.

3. The method of claim 2 wherein the wireless transceiver wirelessly exchanging the user data with the UEs based on the scheduling to serve the UEs with the CA intra-band SCCs comprises the wireless transceiver wirelessly exchanging the user data with the UEs based on the scheduling to serve the UEs with the CA intra-band non-contiguous SCCs.

4. The method of claim 3 further comprising, after disabling the LTE channel for the UEs that use the LTE channel for their CA inter-band SCCs but not for their CA PCCs, identifying other ones of the UEs that use the LTE channel for their CA intra-band non-contiguous SCCs but not for their CA PCCs and disabling the LTE channel for the other ones of the UEs that use the LTE channel for their CA inter-band non-contiguous SCCs.

5. The method of claim 4 wherein the data processing system scheduling the CA intra-band SCCs comprises scheduling CA intra-band contiguous SCCs.

6. The method of claim 5 wherein the wireless transceiver wirelessly exchanging the user data with the UEs based on the scheduling to serve the UEs with the CA intra-band SCCs comprises the wireless transceiver wirelessly exchanging the user data with the UEs based on the scheduling to serve the UEs with the CA intra-band contiguous SCCs.

7. The method of claim 6 further comprising, after disabling the LTE channel for the UEs that use the LTE channel for their CA inter-band non-contiguous SCCs but not for their CA PCCs, identifying additional ones of the UEs that use the LTE channel for their CA intra-band contiguous SCCs but not for their CA PCCs and disabling the LTE channel for the additional ones of the UEs that use the LTE channel for their CA inter-band contiguous SCCs.

8. The method of claim 1 further comprising, in the LTE access node, the data processing system enabling the CA data communication service for the UEs based on UE location.

9. The method of claim 1 further comprising, in the LTE access node, the data processing system enabling the CA data communication service for the UEs based on UE Access Point Name (APN).

10. The method of claim 1 wherein the LTE access node comprises an eNodeB.

11. A Long Term Evolution (LTE) access node to serve User Equipment (UEs) with a wireless Carrier Aggregation (CA) data communication service, the LTE access node comprising:
    a data processing system configured to schedule CA Primary Component Carriers (PCCs), CA intra-band Secondary Component Carriers (SCCs), and CA inter-band SCCs for the UEs;
    a wireless transceiver configured to wirelessly exchange user data with the UEs based on the scheduling to serve the UEs with the CA PCCs, the CA intra-band SCCs, and the CA inter-band SCCs; and
    the data processing system configured to detect that a number of the UEs exceeds a UE threshold, and in response, identify ones of the UEs that use an LTE channel for their CA inter-band SCCs but not for their CA PCCs and disable the LTE channel for the ones of the UEs that use the LTE channel for their CA inter-band SCCs but not for their CA PCCs.

12. The LTE access node of claim 11 wherein the data processing system is configured to schedule CA intra-band non-contiguous SCCs.

13. The LTE access node of claim 12 wherein the wireless transceiver is configured to wirelessly exchange the user data with the UEs based on the scheduling to serve the UEs with the CA intra-band non-contiguous SCCs.

14. The LTE access node of claim 13 further comprising, after disabling the LTE channel for the UEs that use the LTE channel for their CA inter-band SCCs but not for their CA PCCs, the data processing system configured to identify other ones of the UEs that use the LTE channel for their CA intra-band non-contiguous SCCs but not for their CA PCCs and disable the LTE channel for the other ones of the UEs that use the LTE channel for their CA inter-band non-contiguous SCCs.

15. The LTE access node of claim 14 wherein the data processing system is configured to schedule CA intra-band contiguous SCCs.

16. The LTE access node of claim 15 wherein the wireless transceiver is configured to wirelessly exchange the user data with the UEs based on the scheduling to serve the UEs with the CA intra-band contiguous SCCs.

17. The LTE access node of claim 16 further comprising, after disabling the LTE channel for the UEs that use the LTE channel for their CA inter-band non-contiguous SCCs but not for their CA PCCs, the data processing system is configured to identify additional ones of the UEs that use the LTE channel for their CA intra-band contiguous SCCs but not for their CA PCCs and disable the LTE channel for the additional ones of the UEs that use the LTE channel for their CA inter-band contiguous SCCs.

18. The LTE access node of claim 11 further comprising, in the LTE access node, the data processing system configured to enable the CA data communication service for the UEs based on UE location.

19. The LTE access node of claim 11 further comprising, in the LTE access node, the data processing system configured to enable the CA data communication service for the UEs based on UE Access Point Name (APN).

20. The LTE access node of claim 11 wherein the LTE access node comprises an eNodeB.

* * * * *